United States Patent
Lin et al.

(10) Patent No.: US 9,306,759 B2
(45) Date of Patent: Apr. 5, 2016

(54) ULTRA HIGH-FIDELITY CONTENT DELIVERY USING A MOBILE DEVICE AS A MEDIA GATEWAY

(71) Applicant: Cellco Partnership, Arlington, VA (US)

(72) Inventors: Te-Sheng Lin, Cresskill, NJ (US); John Gu, Rockaway, NJ (US); Xin Ren, Edison, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 143 days.

(21) Appl. No.: 14/011,761

(22) Filed: Aug. 28, 2013

(65) Prior Publication Data

US 2015/0063187 A1 Mar. 5, 2015

(51) Int. Cl.
*H04N 13/04* (2006.01)
*H04N 7/173* (2011.01)
*G06F 17/21* (2006.01)
*H04L 12/18* (2006.01)

(52) U.S. Cl.
CPC .................................. *H04L 12/189* (2013.01)

(58) Field of Classification Search
CPC . H04L 12/189; H04L 29/06455; H04L 63/20; H04N 21/20; H04N 21/41407; H04N 7/24; H04N 5/91; H04W 4/06; H04H 20/40
USPC ......................................................... 370/312
See application file for complete search history.

(56) References Cited

U.S. PATENT DOCUMENTS

| | | | | |
|---|---|---|---|---|
| 8,495,697 | B1 * | 7/2013 | Goldfeder et al. | 725/142 |
| 2005/0097624 | A1 * | 5/2005 | Salo et al. | 725/136 |
| 2008/0020762 | A1 * | 1/2008 | Fischer | 455/435.1 |
| 2009/0019509 | A1 * | 1/2009 | Horn et al. | 725/118 |
| 2009/0154445 | A1 * | 6/2009 | Jiang et al. | 370/349 |
| 2011/0002377 | A1 * | 1/2011 | Raveendran | 375/240.01 |
| 2011/0213881 | A1 * | 9/2011 | Stavenow et al. | 709/224 |
| 2011/0307935 | A1 * | 12/2011 | Kotecha | 725/119 |

OTHER PUBLICATIONS

3GPP TS 22.146 version 6.8.0 Release 6, Multimedia Broadcast/Multicast Service (MBMS), Global System for Mobile Communications, ETSI, 19 pages.*
Ben Drawbaugh, "First Ultra HD channel goes live in Europe," available at http://www.engadget.com/2013/01/14/first-ultra-hd-channel-goes-live-in-europe (visited Aug. 15, 2013), Jan. 14, 2013.
Matthew Goldman, "High Efficiency Video Coding (HEVC)," available at http://www.atlanta-smpte.org/HEVC-for-NASCAR.pdf (visited Aug. 15, 2013), Oct. 15, 2012.

(Continued)

*Primary Examiner* — Edan Orgad
*Assistant Examiner* — Vanneilian Lalchinthang

(57) ABSTRACT

A system may include a group of user devices; and one or more base stations configured to receive programming content from a content provider, and distribute the received programming content, via a broadcast or multicast technique, to the group of user devices. A particular user device, of the group of user devices, may receive distributed programming content, and output, to device that is external to the user device, the programming content received from the particular base station.

19 Claims, 11 Drawing Sheets

(56) References Cited

OTHER PUBLICATIONS

Author unknown, "MHL Consortium Announces New Specification with Major Advancements for Mobile and Consumer Electronics Connectivity," available at http://http://hosted.verticalresponse.com/718513/cd96dac959/288161745/4d141357a9 (visited Aug. 20, 2013), Aug. 20, 2013.

Terrence O'Brien, "SES demos first Ultra HD transmission in more efficient HEVC standard," available at http://www.engadget.com/2013/04/20/ses-demos-first-ultra-hd-transmission-in-more-efficient-hevc-sta (visited Aug. 15, 2013), Apr. 20, 2013.

\* cited by examiner

500 ⟶

| TMGI | Channel ID | Subscribed? |
|---|---|---|
| A | 1 | Yes |
| B | 2 | Yes |
| C | 3 | No |

| TMGIs | Channel ID |
|---|---|
| D, E | 4 |
| F, G | 5 |
| H, I | 6 |

| TMGI(s) | Channel ID |
|---|---|
| J | 7 |
| K, L | 8 |
| M, N, O | 9 |

FIG. 5C

ULTRA HIGH-FIDELITY CONTENT DELIVERY USING A MOBILE DEVICE AS A MEDIA GATEWAY

BACKGROUND

Television content providers, such as cable companies, utilize vast amounts of hardware infrastructure in order to deliver television programming content to users. This infrastructure may include, for example, copper wiring and/or optical fiber cabling that is capable of carrying high definition ("HD") content. As audio and video fidelity of content increases (e.g., as Ultra HD, or "4K," content becomes available), bandwidth requirements for delivering the content may also increase.

As a result of these increasing bandwidth requirements, traditional delivery methods may require costly upgrades (such as increased quantity and/or quality of copper wiring and/or optical fiber cabling) in order to accommodate higher quality content. Thus, current display device technology, which may be capable of displaying Ultra HD content, is rapidly outgrowing the ability of content providers to deliver real-time Ultra HD content.

BRIEF DESCRIPTION OF THE DRAWINGS

FIGS. 5A-5C illustrate example data structures that may be utilized by one or more devices of some implementations described herein;

DETAILED DESCRIPTION OF PREFERRED EMBODIMENTS

The following detailed description refers to the accompanying drawings. The same reference numbers in different drawings may identify the same or similar elements.

Figure 1:
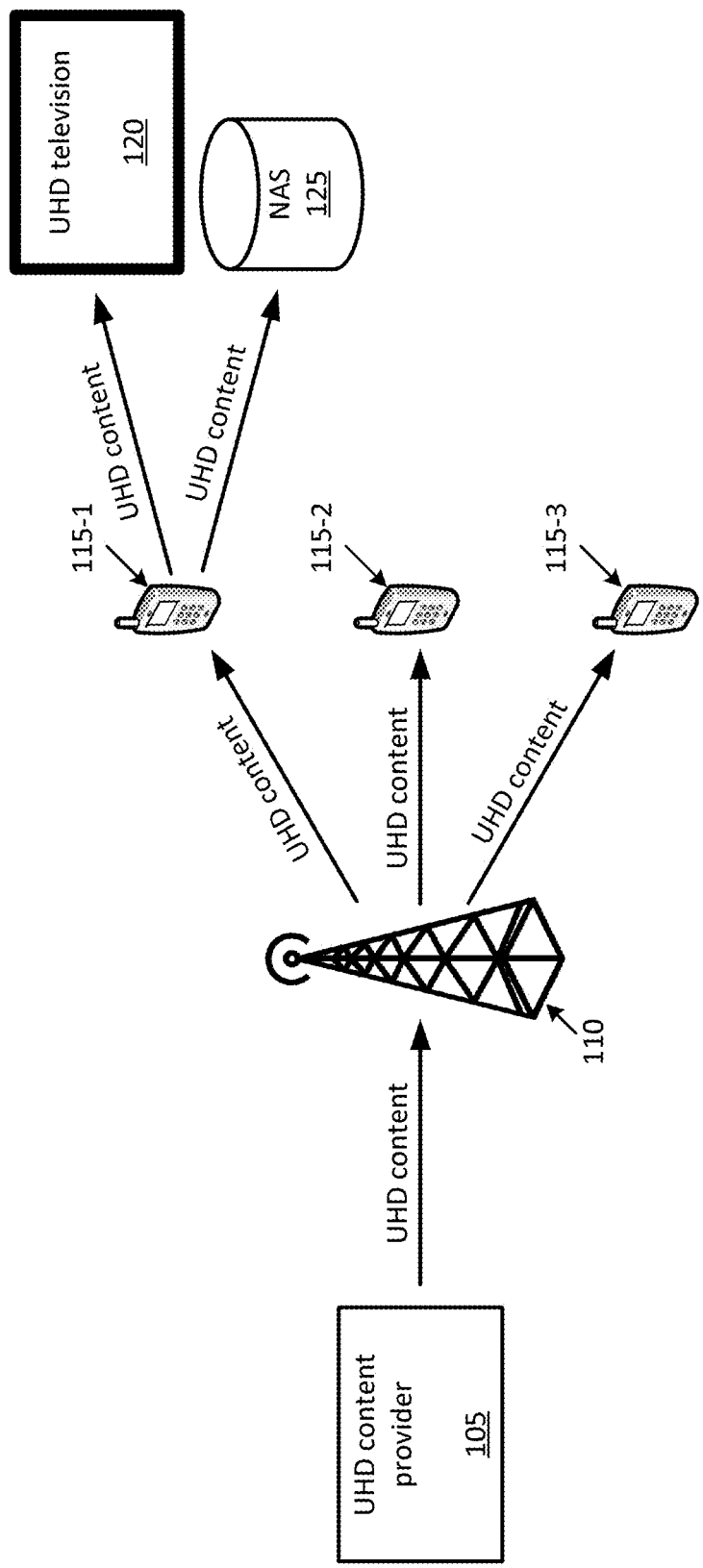
FIG. 1 illustrates an example overview of one or more implementations described herein.

Techniques described herein may allow for the delivery of high-bandwidth content to mobile devices, which may act as media gateways. The high-bandwidth content may include, for example, Ultra High Definition ("UHD") television programming content. As shown in FIG. 1, for example, UHD content provider 105 may provide UHD content, which may be forwarded to one or more base stations 110 (e.g., base stations that are associated with one or more wireless networks). Base station 110 may broadcast the UHD content to user devices (e.g., wireless telephones) that are in communication with base station 110, such as user devices 115-1 through 115-3 (hereinafter sometimes referred to collectively as "user devices 115," or individually as "user device 115"). For example, base station 110 may use a Multimedia Broadcast Multicast Service ("MBMS") and/or an evolved MBMS ("eMBMS") technique (e.g., as standardized by the Third Generation Partnership Project ("3GPP")) to broadcast the UHD content to user devices 115.

User devices 115 may act as media gateways for the received UHD content. For example, user device 115 may present a channel guide, which a user may browse in order to select content (e.g., television programming that corresponds to a particular channel), in which the user is interested. As shown in FIG. 1, user device 115-1 may output the selected content to UHD television 120. Additionally, or alternatively, user device 115-1 may output the selected content to network attached storage ("NAS") 125, from which the content may be accessed at a later time (e.g., by user device 115-1, UHD television 120, and/or another device).

By utilizing user devices 115 as media gateways, content providers (such as cable or satellite television providers) may eliminate or mitigate the need to increase infrastructure necessary for delivering increasing amounts of content, and/or increasingly higher fidelity content. For example, user devices 115, according to some implementations herein, may replace dedicated set top boxes ("STBs"), which may have been traditionally deployed in order to, for example, decode signals, received via a wired connection, for display on a viewing device. Since STBs may be replaced by user devices 115, the need to upgrade STBS in order to accommodate increasingly higher fidelity content may be eliminated. Furthermore, since some implementations described herein utilize an air interface to broadcast content, the need to upgrade or add physical infrastructure, in order to accommodate higher fidelity content, may be eliminated or mitigated.

Also, broadcasting techniques (such as MBMS and/or eMBMS) for transmitting content may consume fewer resources than unicast techniques. For example, in a unicast transmission, content transmitted to multiple user devices 115 may require multiple channels that are each dedicated to a single user device 115. In contrast, broadcasting techniques may utilize a single channel to broadcast content to multiple mobile devices 115.

Figure 2:
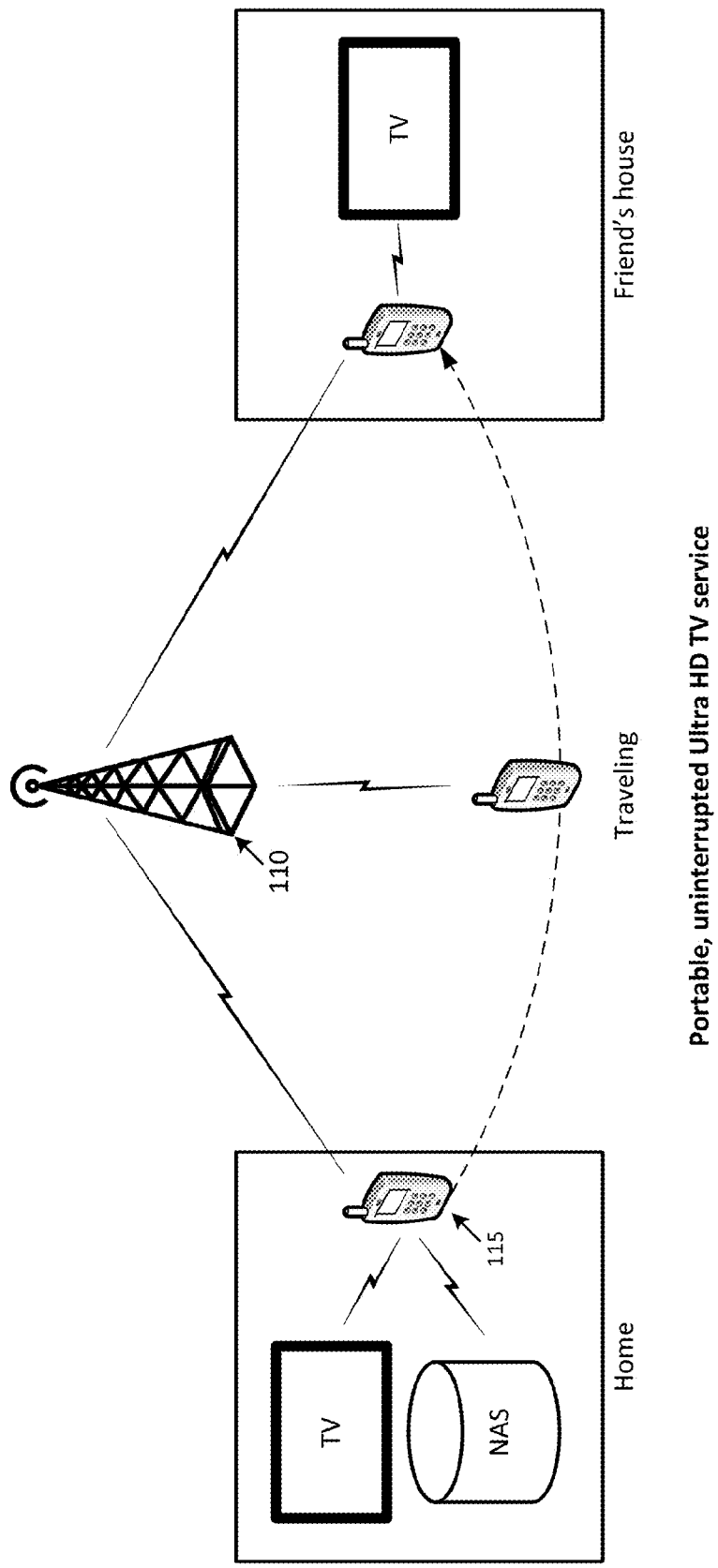
FIG. 2 illustrates an example situation in which a user device may allow for portable, uninterrupted content delivery.

Additionally, users may enjoy enhanced flexibility in enjoying content to which they are subscribed. For example, as shown in FIG. 2, a user may be able to access UHD programming content from anywhere that the user's user device 115 is able to communicate with a base station 110. For instance, user device 115 may be located in the user's home, and may act as a media gateway for UHD programming content received from a base station. That is, user device 115 may, for example, output UHD programming content to a UHD-capable television device and/or a NAS. Assume that the user may decide to visit a friend's house. While the user is en route to the friend's house, user device 115 may continue to receive UHD programming content from a base station (e.g., the same base station or a different base station). When the user arrives at the friend's house, the user may pair user device 115 with another television at the friend's house, and may use user device 115 as a media gateway to facilitate the display of UHD programming content, received via user device 115, on the television at the friend's house. Thus, in contrast with currently existing systems, where content may only accessible only via a user's STB (which is typically attached via wires at a fixed location, such as the user's home), a user may enjoy enhanced freedom and connectivity.

Figure 3:
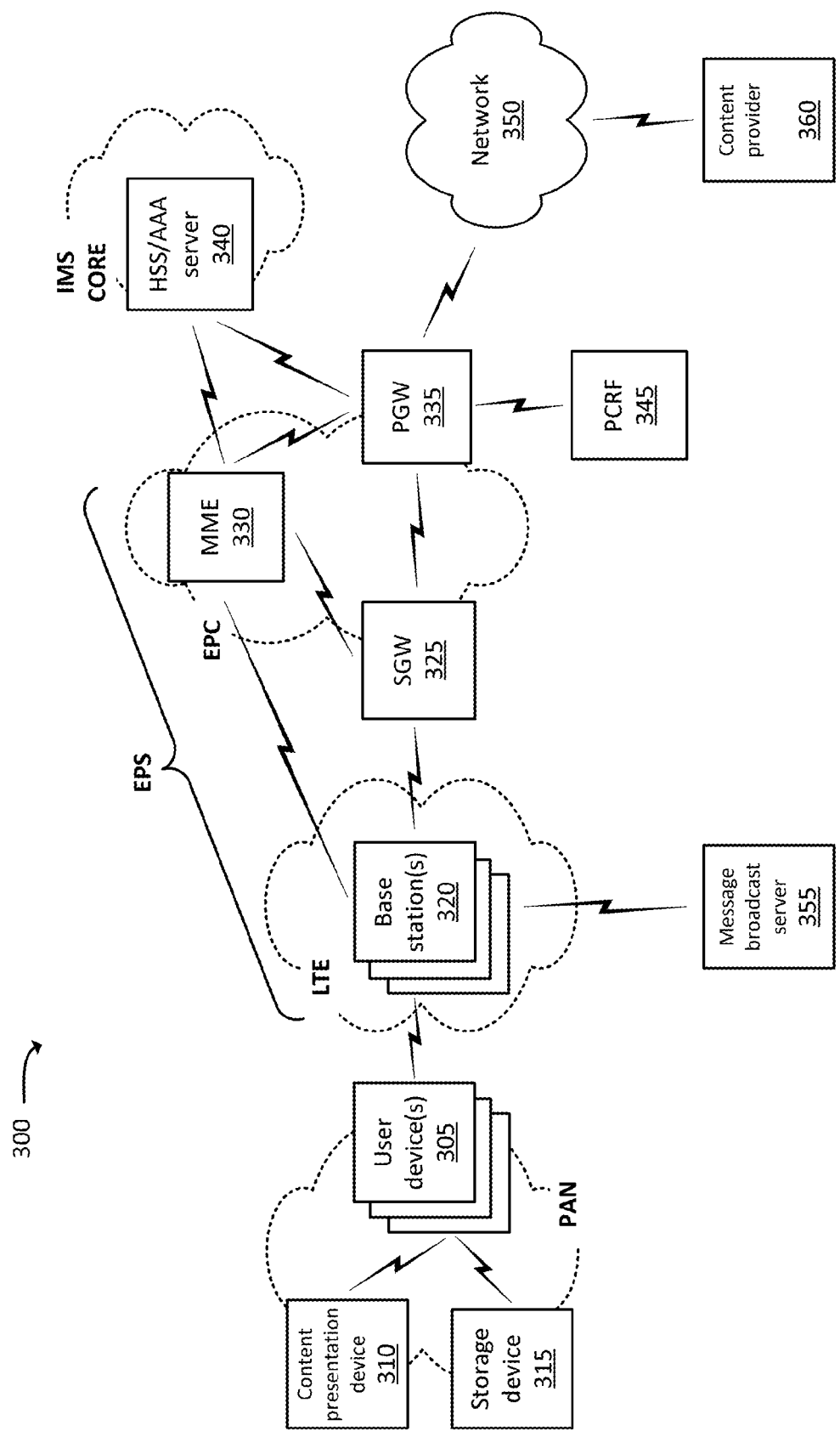
FIG. 3 illustrates an example environment in which systems and/or methods, described herein, may be implemented.

FIG. 3 illustrates an example environment 300, in which systems and/or methods described herein may be implemented. As shown in FIG. 3, environment 300 may include one or more user devices 305, content presentation device 310, storage device 315, one or more base stations 320, serving gateway ("SGW") 325, mobility management entity device ("MME") 330, packet data network ("PDN") gateway ("PGW") 335, home subscriber server ("HSS")/authentication, authorization, accounting ("AAA") server (hereinafter referred to as "HSS/AAA server") 340, policy charging and rules function ("PCRF") 345, network 350, message broadcast server 355, and content provider 360.

The quantity of devices and/or networks, illustrated in FIG. 3, is provided for explanatory purposes only. In practice, there may be additional devices and/or networks; fewer devices and/or networks; different devices and/or networks; or differently arranged devices and/or networks than illustrated in FIG. 3. Alternatively, or additionally, one or more of the devices of environment 300 may perform one or more functions described as being performed by another one or more of the devices of environment 300. Devices of environment 300 may interconnect via wired connections, wireless connections, or a combination of wired and wireless connections.

Environment 300 may include an evolved packet system ("EPS") that includes a long term evolution ("LTE") network and/or an evolved packet core ("EPC") network that operate based on a third generation partnership project ("3GPP") wireless communication standard. The LTE network may be, or may include, a RAN that includes one or more base stations 320, some or all of which may take the form of an eNodeB ("eNB"), via which user device 305 may communicate with the EPC network. The EPC network may include one or more SGWs 325, MMEs 330, and/or PGWs 335, and may enable user device 305 to communicate with network 350 and/or an Internet protocol ("IP") multimedia subsystem ("IMS") core network. The IMS core network may include HSS/AAA server 340, and may manage authentication, session initiation, account information, a user profile, etc. associated with user device 305.

Environment 300 may also include a personal area network ("PAN"), via which user device 305 may communicate with other devices associated with the PAN, such as content presentation device 310 and storage device 315. Devices 305-315 may communicate via short-range wireless communication techniques, such as Bluetooth, Wi-Fi, and/or another wireless communication technique. For example, devices 305-315 may communicate via a near field communication ("NFC") technique, which may typically be associated with a relatively short range and low bandwidth, in order to perform pairing or other configuration. Additionally, or alternatively, devices 305-315 may communicate via one or more wired connections. For instance, in some implementations, user device 305 may communicate with content presentation device 310 via a High Definition Multimedia Interface ("HDMI") cable, an HDMI Mobile High Definition Link ("MHL") cable, or another type of wired connection. In some implementations, the PAN may include an "ad-hoc" network, and in some implementations, the PAN may include one or more central routers, hubs, and/or switches. In some implementations, the PAN may include a local area network ("LAN"), such as a wireless LAN ("WLAN").

User device 305 may include any computation and communication device, such as a wireless mobile communication device that is capable of communicating with one or more networks (e.g., network 350, the PAN) and/or the IMS core). For example, user device 305 may include a radiotelephone; a personal communications system ("PCS") terminal (e.g., a device that combines a cellular radiotelephone with data processing and data communications capabilities); a personal digital assistant ("PDA") (e.g., that can include a radiotelephone, a pager, Internet/intranet access, etc.); a smart phone; a laptop computer; a tablet computer; a camera; a personal gaming system, or another type of mobile computation and communication device.

As described below, user device 305 may receive content, such as Ultra HD television programming content, from content provider 360. User device 305 may receive the content via, for example, base station 320. User device 305 may include hardware and/or software that allows user device 305 to communicate (either wirelessly and/or via a wired connection) with other devices in the same PAN as user device 305. For example, user device 305 may output content, corresponding to content received from content provider 360, to other devices in the same PAN as user device 305.

Content presentation device 310 may include a device that is capable of displaying video and/or audio information. In some implementations, content presentation device 310 may include a standard, off-the-shelf television, such as a television that is capable of supporting HD (e.g., 480p, 720p, 720i, 1080i, 1080p 30 Hz, etc.), Ultra HD (e.g., 2160p, 4320p, etc.), and/or other resolutions (e.g., 1080p 60 Hz, Full HD 3D ("FHD3D"), etc.). Content presentation device 310 may include, or be communicatively coupled with, hardware and/or software that allows content presentation device 310 to receive content, such as Ultra HD content, from user device 305 and/or another source. For example, content presentation device 310 may include one or more wireless radio transceivers that communicate with user device 305 via, for example, Bluetooth, Wi-Fi, NFC, or another wireless communication technique. In some implementations, the wireless communication technique may be a technique that is capable of supporting UHD content or other high-fidelity content, such as the Institute of Electrical and Electronics Engineers ("IEEE") 802.11ac wireless standard, the 802.11ad wireless standard (also referred to as "WiGig"), or another suitable standard.

Content presentation device 310 may implement one or more standards that facilitate media communications to and/or from user device 305 and/or or storage device 315, such as a Digital Living Network Alliance ("DLNA") standard, a Universal Plug and Play ("UPnP") standard, a Digital Transmission Content Protection over IP ("DTCP-IP") standard, a Wi-Fi Alliance Miracast™ standard, a High-Bandwidth Digital Content Protection ("HDCP") standard (e.g., HDCP 2.2, which may enable the secure delivery of UHD content), etc. In some implementations, content presentation device 310 may be communicatively coupled to an external device, such as a media player device, that is capable of receiving content from user device 305 and, in turn, transmitting the content to content presentation device 310.

Storage device 315 may include one or more devices that are capable of storing content, such as Ultra HD content, provided by user device 305. For example, storage device 315 may include a network attached storage ("NAS") and/or another network-accessible storage device. Storage device 315 may include, or be communicatively coupled with a device that includes, one or more wireless radio transceivers that are capable of communicating with user device 305 and/or content presentation device 310. As described below, storage device 315 may enable user device 305 and/or content presentation device 310 to present content that was previously received and stored by storage device 315. In some implementations, content presentation device 310 may include an audio device or set of audio devices, such as a set of speakers, a set of headphones, etc. In some such implementations, the audio device (or devices) may be capable of outputting high fidelity audio, such as 5.1 channel audio, 7.1 channel audio, or other types of audio.

Base station 320 may include one or more network devices that receive, process, and/or transmit traffic, such as calls, audio, video, text, television programming content, and/or other data, destined for and/or received from user device 305. In one example, base station 320 may be an eNB device and may be part of the LTE network. Base station 320 may receive traffic from and/or send traffic to network 350 via SGW 325 and PGW 335. Base station 320 may send traffic to and/or receive traffic from user device 305 via an air interface.

SGW 325 may include one or more network devices that gather, process, search, store, and/or provide information. For example, SGW 325 may include a gateway, a router, a modem, a switch, a firewall, a network interface card ("NIC"), a hub, a bridge, a proxy server, or some other type of device that processes and/or transfers traffic. SGW 325 may, for example, aggregate traffic received from one or more base stations 320 and may send the aggregated traffic to network 350 via PGW 335.

MME 330 may include one or more computation and communication devices that gather, process, search, store, and/or provide information. For example, MME 330 may perform operations to register user device 305 with the EPS, to establish bearer channels associated with a session with user device 305, to hand off user device 305 from the EPS to another network, to hand off user device 305 from the other network to the EPS, and/or to perform other operations. MME 330 may perform policing operations on traffic destined for and/or received from user device 305.

PGW 335 may include one or more network devices, or other types of computation and communication devices, that gather, process, search, store, and/or provide information in a manner described herein. For example, PGW 335 may include a gateway, a router, a modem, a switch, a firewall, a network interface card ("NIC"), a hub, a bridge, a proxy server, an optical add-drop multiplexer ("OADM"), and/or some other type of device that processes and/or transfers traffic. PGW 335 may aggregate traffic received from one or more SGWs 325, and may send the aggregated traffic to network 350. PGW 335 may also, or alternatively, receive traffic from network 350 and may send the traffic toward user device 305 via SGW 325, and/or base station 320.

HSS/AAA server 340 may include one or more server devices, or other types of devices, that gather, process, search, store, and/or provide information. For example, HSS/AAA server 340 may manage, update, and/or store, in a memory associated with HSS/AAA server 340, profile information associated with a subscriber. The profile information may identify applications and/or services that are permitted for and/or accessible by the subscriber; a mobile directory number ("MDN") associated with the subscriber; bandwidth or data rate thresholds associated with the applications and/or services; information associated with the subscriber (e.g., a username, a password, etc.); rate information; minutes allowed for a subscriber; and/or other information. The subscriber may be associated with user device 305 and/or one or more other user devices 305. Additionally, or alternatively, HSS/AAA server 340 may perform authentication, authorization, and/or accounting operations associated with the subscriber and/or a communication session with user device 305.

PCRF 345 may include one or more server devices, or other types of devices, that aggregate information to and from the EPC network and/or other sources. PCRF 345 may receive information regarding policies and/or subscriptions from one or more sources, such as subscriber databases and/or from one or more users (such as, for example, an administrator associated with PCRF 345).

Network 350 may include one or more wired and/or wireless networks. For example, network 350 may include a cellular network, a public land mobile network ("PLMN"), a second generation ("2G") network, a third generation ("3G") network, a fourth generation ("4G") network, a fifth generation ("5G") network, and/or another network. Additionally, or alternatively, network 350 may include a wide area network ("WAN"), a metropolitan area network ("MAN"), a telephone network (e.g., the Public Switched Telephone Network ("PSTN")), an ad hoc network, an intranet, PDN (e.g., the Internet), a fiber optic-based network, and/or a combination of these or other types of networks.

In some implementations, some or all of network 350 may be provided by one or more cellular network providers. That is, in some such implementations, network devices within, or associated with, network 350, may be provided by the one or more cellular network providers. In some implementations, network 350 may be communicatively coupled to one or more other networks, such as the Internet.

Message broadcast server 355 may include one or more server devices, which may facilitate in the broadcasting of content to multiple user devices 305. In some implementations, message broadcast server 355 may broadcast content, provided by content provider 360 (e.g., UHD television programming content), via one or more base stations 320. A more detailed example of message broadcast server 355, in accordance with some implementations, is described below with respect to FIG. 4. In some implementations, message broadcast server 355 may implement an MBMS standard, an eMBMS standard, a Cell Broadcast Service ("CBS") standard (e.g., as standardized by the 3GPP), and/or another methodology of broadcasting messages or other content.

In some implementations, message broadcast server 355 may cause multiple different broadcast bearers to be created, each of which may correspond to a particular content stream. For example, one broadcast bearer may correspond to one or more television channels. As another example, multiple broadcast bearers may correspond to a single television channel. Each bearer may be associated with a bearer identifier, such as a Temporary Mobile Group Identity ("TMGI"), and/or another identifier.

Figure 4:
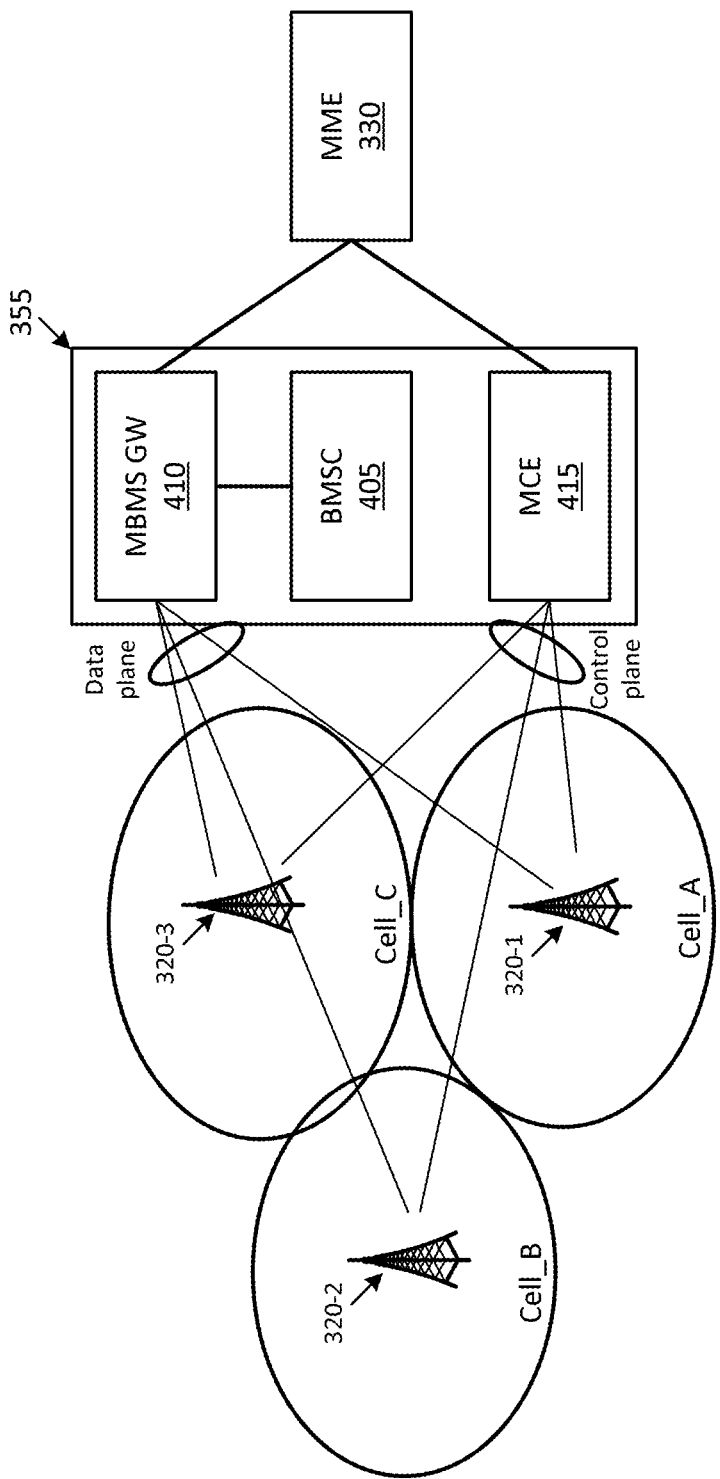
FIG. 4 illustrates an alternate view of some components of an environment in which systems and/or methods, described herein, may be implemented.

FIG. 4 illustrates some components of environment 300 in additional detail. As shown in FIG. 4, message broadcast server 355 may include Broadcast Multicast Service Center ("BMSC") 405, MBMS Gateway ("MBMS GW") 410, and Multi-cell/multicast Coordination Entity ("MCE") 415. In the example shown in FIG. 4, message broadcast server 355 may be in communication with base stations 320-1 through 320-3, each of which may be associated with a respective coverage area, or "cell" (shown in the figure as "Cell_A," "Cell_B," and "Cell_C").

BMSC 405 may include one or more computation or communication devices that provide for the coordination of broadcasting and/or multicasting using MBMS, eMBMS, CBS, and/or another broadcast technique. BMSC 405 may perform functions relating to authorization, charging, and assignment of communication channels. For example, BMSC 405 may assign a particular quantity of broadcast and/or multicast data channels for various content streams. BMSC 405 may also receive content (e.g., content from content provider 360, such as UHD television programming content) for broadcast transmission, and may forward the received content as part of a broadcast or a multicast transmission.

MBMS GW 410 may include one or more computation and communication devices that provide for the coordination of the sending of broadcast and/or multicast data (e.g., IP multicast packets) to base stations 320. MBMS GW 410 may receive the content, which is to be broadcasted and/or multicasted, from BMSC 405. As illustrated, MBMS GW 410 may transmit MBMS data plane traffic to base stations 320.

As mentioned above, MME 330 may perform policing operations on traffic destined for and/or received from user device 305. MME 330 may, in some implementations, aid in the control signaling necessary for messages to be broadcasted and/or multicasted to user devices 305 associated with base stations 320.

MCE 405 may include one or more computation and communication devices that may perform admission control, allocation of radio resources throughout a Multimedia Broadcast Multicast Service Single Frequency Network ("MBSFN") area, MBMS session control signaling, and make decisions on radio configurations. As illustrated, MCE 415 may transmit MBMS control plane traffic to base stations 320.

In eMBMS, cells associated with base stations 320 may be grouped to obtain MBSFN areas. Broadcast and/or multicast data channels in an MBSFN area may be synchronized so that identical broadcast and/or multicast radio signals may be generated, at the same time, for multiple cells. For example, MBSFN areas may be defined that cover the area associated with multiple ones of the illustrated cells. One example MBSFN area may correspond to the area covered by Cell_A and Cell_B. A broadcast and/or multicast data channel, transmitted in the MBSFN area, may include radio signals that are synchronized in Cell_A and Cell_B.

Examples described herein are described in implementations where content is broadcasted to user devices 305. That is, base stations 320 may broadcast content, via broadcast bearers, to user devices 305. In this manner, it is possible that all user devices 305, which are in communication with base stations 320, may receive the content broadcasted from base stations 320. In alternate implementations, one or more base stations 320 may multicast content to multiple user devices 305, without necessarily broadcasting the content to all user devices 305. In multicast implementations, message broadcast server 355 may provide information to base stations 320, indicating which multicast bearers should be associated with which user devices 305.

FIGS. 5A-5C illustrate example data structures 500-510, which may be stored by, for example, one or more user devices 305. Data structures 500-510 may aid in the mapping of broadcast bearers, via which content is received by user devices 305, to logical "channels," which may be selectable for access by users.

As shown in FIG. 5A, data structure 500 may include information that correlates a TMGI to a channel identifier (shown in the figure as "Channel ID"). Data structure 500 may also, for each channel, include an indication regarding whether the particular user device 305, associated with data structure 500, is subscribed to the channel. The "Subscribed?" field may aid in the enforcement of policies relating to subscriptions to certain channels, or packages of channels, such that user devices 305, which are not authorized to access certain channels, are not able to access such channels. In some implementations, subscription information may be received from HSS/AAA server 340. For instance, when a user subscribes to receive access to a particular channel, HSS/AAA server 340 may be notified, and may update subscription information stored by HSS/AAA server 340. HSS/AAA server 340 may notify user device 305, associated with the user, which may update the "Subscribed?" information shown in data structure 500.

While the information shown in FIG. 5A is shown in a single data structure 500, in some implementations, multiple data structures may be used. For example, one data structure may store information correlating bearer identifiers to channels, while another data structure may store subscription information, which indicates which channels are permitted to be accessed by user device 305.

In some implementations, subscription information may be indicated in a different way than illustrated in FIG. 5A. For example, in some implementations, data structure 500 may not include a "Channel ID" field for channels to which the user is not subscribed. For instance, referring to the information shown in data structure 500, some such implementations may include information correlating TMGIs A and B to channels 1 and 2, respectively, but may omit information correlating TMGI C to channel 3.

As also mentioned above, some implementations may use a multicasting technique to provide content to user devices 305. In some such implementations, message broadcast server 355 may receive or store subscription information, correlating user devices 305 to subscribed channels and/or the TMGIs associated with the channels. Message broadcast server 355 may, for example, receive and/or store one instance of data structure 500 for each user device 305. In other implementations, message broadcast server 355 may receive and/or store a portion of data structure 500, or information derived from data structure 500, in order to correlate user devices 305 to channels to which user devices 305 are subscribed. Using this information, message broadcast server 355 may notify base stations 320 which user devices 305 are associated with which multicast bearers.

FIG. 5B illustrates another example data structure 505, which illustrates a mapping between TMGIs and channels, in an implementation where multiple bearers are used for a single channel. Using multiple bearers may allow for a higher amount of bandwidth to be used for the channel, as opposed to implementations in which one bearer is used for the channel. While subscription information is not illustrated in FIG. 5B for the sake of simplicity, in some implementations, data structure 505 may include subscription information in a manner similar to that described above with respect to data structure 500.

FIG. 5C illustrates yet another example data structure 510, which illustrates a mapping between TMGIs and channels, in an implementation where a variable number of bearers are used for a single channel. For instance, one bearer may be used for channel 7, two bearers may be sued for channel 8, and three bearers may be used for channel 13. Although not shown, in some implementations, one bearer may correspond to multiple channels. Also, while subscription information is not illustrated in FIG. 5C for the sake of simplicity, in some implementations, data structure 510 may include subscription information in a manner similar to that described above with respect to data structure 500.

As mentioned above, in some implementations, the information stored in data structures 500-510 may be received by user device 305 when a user associated with user device 305 subscribes to a channel or a set of channels. In some implementations, the information stored in data structures 500-510 may be received at another time, such as when user device 305 is initially manufactured, configured, or deployed. In some implementations, user device 305 may receive the information stored in data structures 500-510 based on information manually provided by a user, such as an administrator associated with network 350 or content provider 360.

Figure 6:
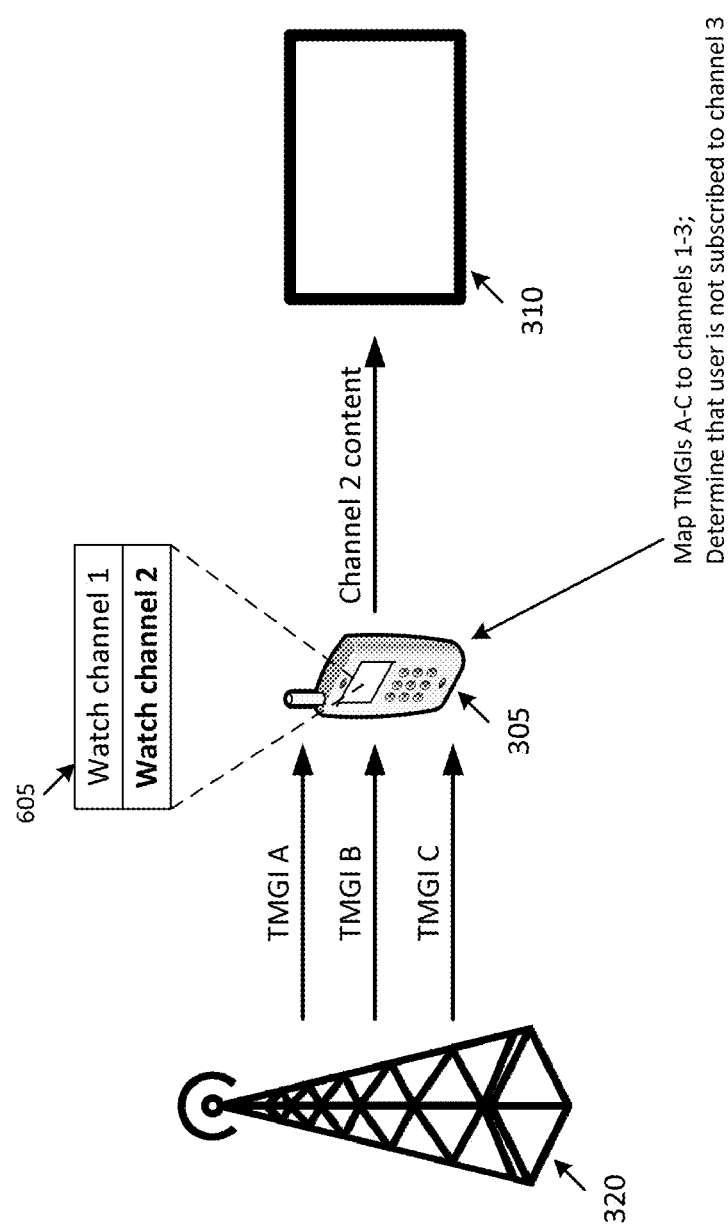
FIG. 6 conceptually illustrates a user device acting as a media gateway.

FIG. 6 conceptually illustrates a mapping operation that may be performed by user device 305, based on information stored in example data structures 500-510. As shown in FIG. 6, base station may broadcast or multicast (e.g., using MBMS, eMBMS, CBS, and/or another broadcast or multicast technique) content over three bearers, which may each be identified by a particular TMGI (in the figure, "TMGI A," "TMGI B," and "TMGI C"). User device 305 may receive the content over these bearers and may identify, based on the information stored in data structure 500, that TMGI A is associated with channel 1, that TMGI B is associated with channel 2, and that TMGI C is associated with channel 3. Furthermore, user device 305 may determine that a user of user device 305 is not subscribed to channel 3. Since the content, received over the bearers identified by TMGIs A and B, has not been selected by the user, user device 305 may "discard" the content. In other words, while a hardware layer and/or a transport layer of user device 305 may receive the content, these layers of user device 305 may forgo passing the received content to a higher layer, such as a kernel layer or an application layer of user device 305. In this sense, an application, running on user device 305, may have no knowledge of any discarded content.

In a multicast implementation, base station 320 may multicast content to user devices 305 that are subscribed to the content, and may forgo multicasting the content to user devices 305 that are not subscribed to the content. In some such implementations, the determination of whether a particular user device 305 may be made at the time of multicasting content, as opposed to by the user device 305 at the time of receiving the content.

User device 305 may notify, via user interface 605, the user that channels 1 and 2 are available for viewing, and may further allow the user to select channel 1 or 2. In the example shown in FIG. 6, assume that the user has selected channel 2, and that user device 305 is communicatively coupled to content presentation device 310. Based on the selection of channel 2, user device 305 may output content, corresponding to content received via the bearer identified by TMGI B, to content presentation device 310. In this sense, user device 305 may act as a media gateway, obviating the need for a STB to view broadcasted programming content.

Figure 7:
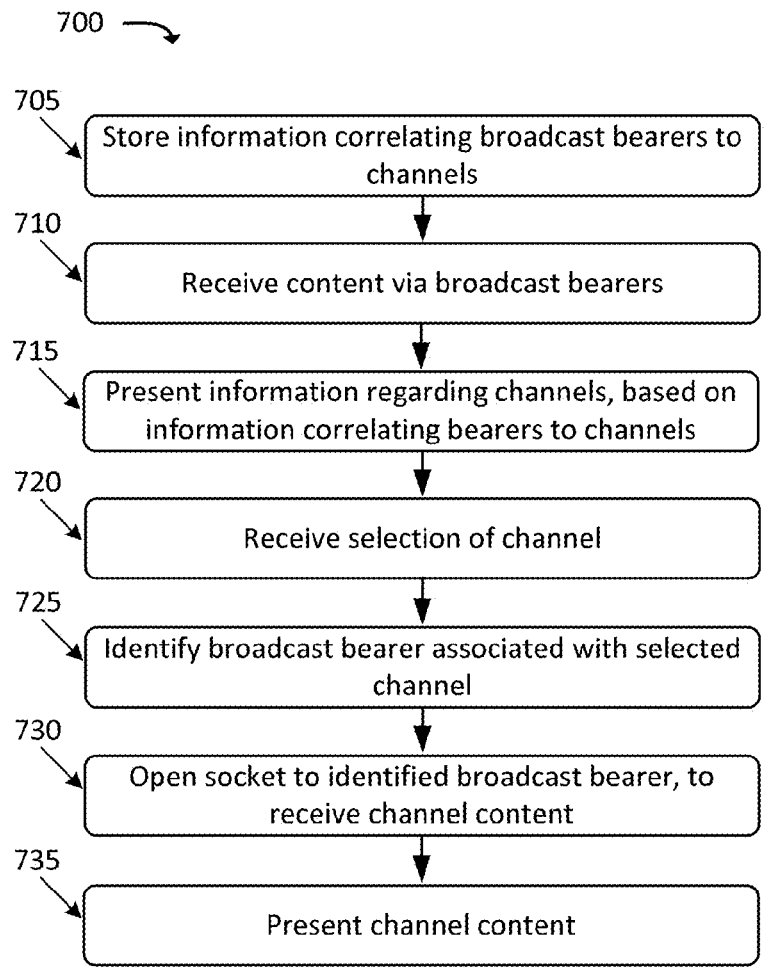
FIG. 7 illustrates an example processes via which a user device may act as a media gateway.

FIG. 7 illustrates an example process 700 via which a user device may act as a media gateway. In one example implementation, process 700 may be performed by user device 305. In other implementations, some or all of process 700 may be performed by one or more other devices in lieu of, or in conjunction with, user device 305.

Process 700 may include storing information correlating broadcast bearers to channels (block 705). For example, user device 305 may store information in a data structure similar to one or more of data structures 500-510, described above with respect to FIGS. 5A-5C. As mentioned above, user device 305 may receive this correlation information from, for example, HSS/AAA server 340, or from another source. As also mentioned above, the channels, referred to by the correlation information, may be channels (e.g., television programming channels) to which a user of user device 305 has subscribed. Additionally, some or all of the television programming channels may be channels via which HD content, UHD content, or other high-fidelity content is provided.

Process 700 may also include receiving content via the broadcast bearers (block 710). For instance, user device 305 may receive multicasted communications from base station 320 (e.g., via MBMS, eMBMS, CBS, and/or another broadcasting technique). In some implementations, the communications received may include television programming content, which may be HD television programming content or UHD television programming content. The content may be encoded according to a High Efficiency Video Coding ("HEVC") compression standard, and/or via another encoding or compression technique.

As mentioned above, user device 305 may "discard" some or all of the content (received at block 710). For instance, while a hardware layer and/or a transport layer of user device 305 may receive the content, these layers of user device 305 may forgo passing the received content to a higher layer, such as a kernel layer or an application layer of user device 305. As described below, the lower layers of user device 305 may provide some of the received content to a higher layer of user device 305 when a socket (e.g., a software interface between an application layer and a transport layer of user device 305), associated with one or more of the bearers, has been opened by user device 305.

Figure 8:
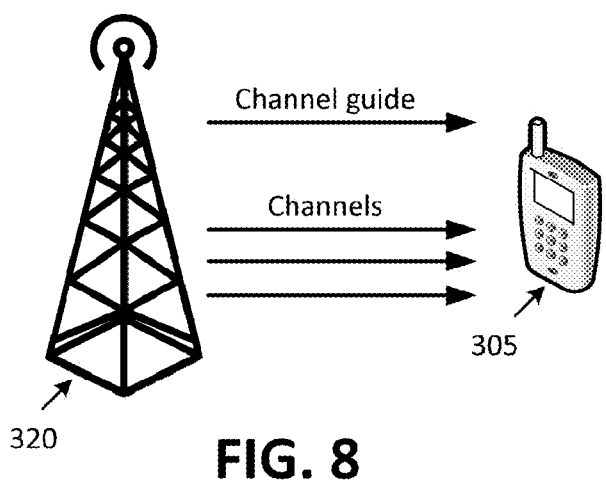
FIG. 8 conceptually illustrates a channel guide being broadcasted over one bearer, while programming content is broadcasted over another set of bearers.
Figure 9:
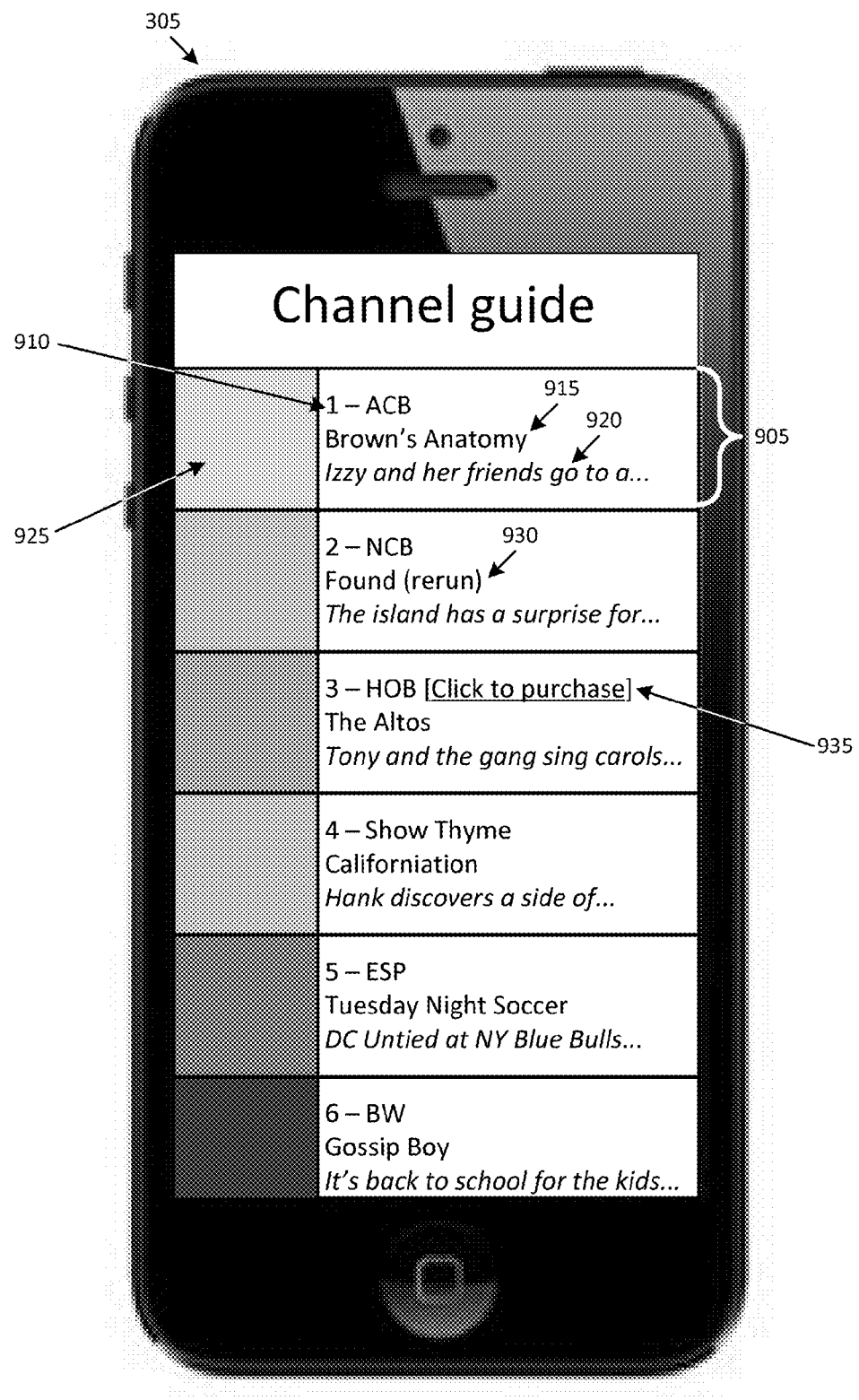
FIG. 9 illustrates an example user interface, corresponding to a programming guide, that may be displayed by a user device.

Process 700 may further include presenting information regarding channels, based on information correlating the multicasted bearers to channels (block 715). For example, in some implementations, user device 305 may use information stored in, for example, one or more of data structures 500-515, in order to correlate the content, received via the broadcast bearers, to channels. In some implementations, as conceptually illustrated in FIG. 8, a portion of the received content (e.g., content received via a particular bearer) may correspond to a channel guide. In some implementations, the channel guide may be received via unicast transmission, or may be generated from control information that is included in broadcast/multicast bearers associated with channel content. The content that corresponds to the channel guide may include information that enables user device 305 to display a user interface that presents information regarding available channels, and allows for a user to select options (e.g., view, record, etc.) received content. An example of such a user interface is described below with respect to FIG. 9.

Returning to FIG. 7, process 700 may additionally include receiving a selection of a channel (block 720). For instance, user device 305 may receive a selection from a user of one a particular channel, presented via the channel guide.

Process 700 may also include identifying a broadcast bearer associated with the selected channel (block 725). For example, user device 305 may use the information, stored at block 705, to identify one or more broadcast bearers associated with the selected channel.

Process 700 may further include opening a socket to the identified broadcast bearer, to receive channel content associated with the identified broadcast bearer (block 730). For example, user device 305 may open a socket, in order to enable an application layer of user device 305 to receive and/or present the content delivered over the broadcast bearer. The application layer may include, for example, one or more applications that decrypt, decode, transcode, or otherwise process the content. For example, assuming the content includes 4K UHD video content that has been encoded via HEVC, user device 305 may include an HEVC decoder, and/or a transcoder that transcodes the HEVC encoding to a different type of encoding. The application layer of user device 305 may further include applications that allow content to be conveniently outputted to content presentation device 310 and/or storage device 315 (e.g., a DLNA- or a UPnP-compatible application).

Process 700 may additionally include presenting the received channel content (block 735). For example, user device 305 may output the received content to content presentation device 310 and/or to storage device 315. The outputting may be based on a user preference or selection. For instance, user device 305 and/or content presentation device 310 may have been previously configured, so that user device 305 is able to output content to content presentation device 310, which may present the content (e.g., via a DLNA or UPnP setup, via a configuration of a media player that is communicatively coupled to user device 305 and content presentation device 310, etc.).

Process 700 is described above in the context of broadcast communications. However, in practice, some or all of process 700 may also be performed by a user device 305 that receives multicast communications (or communications delivered via another technique) from base station 320.

As mentioned above, FIG. 9 illustrates an example of a user interface that corresponds to a channel guide, according to some implementations. As shown, the example channel guide may include information relating to multiple different channels (channels 1-6 in this example). Each channel may include a separate display area relating to the channel. For example, display area 905 may correspond to channel 1.

Display area 905 may include channel identifier 910, content identifier 915, content summary 920, and content preview 925. Channel identifier 910 may include identifying information for a channel, such as channel number, network name, channel call sign, and/or another identifier. Content identifier may include identifying information for the content available on a particular channel, such as the name of a television program being shown on the particular channel (either presently or at a future time). Content summary 920 may include a summary of a television program being shown on a particular channel. Content preview 925 may include a picture associated with the television program. In some implementations, content preview 925 may additionally, or alternatively, include video and/or audio associated with the television program.

The user interface may also include other information or options. For instance, the user interface may include rerun indicator 930, indicating that a television show is a rerun. As another example, the user interface may include subscribe or purchase option 935, which may be available for channels to which a user has not subscribed. Selecting option 935 may cause user device 305 to present a user interface (e.g., a web page), via which the user may purchase or subscribe to a particular channel or program (e.g., a premium channel or a pay-per-view program).

Figure 10:
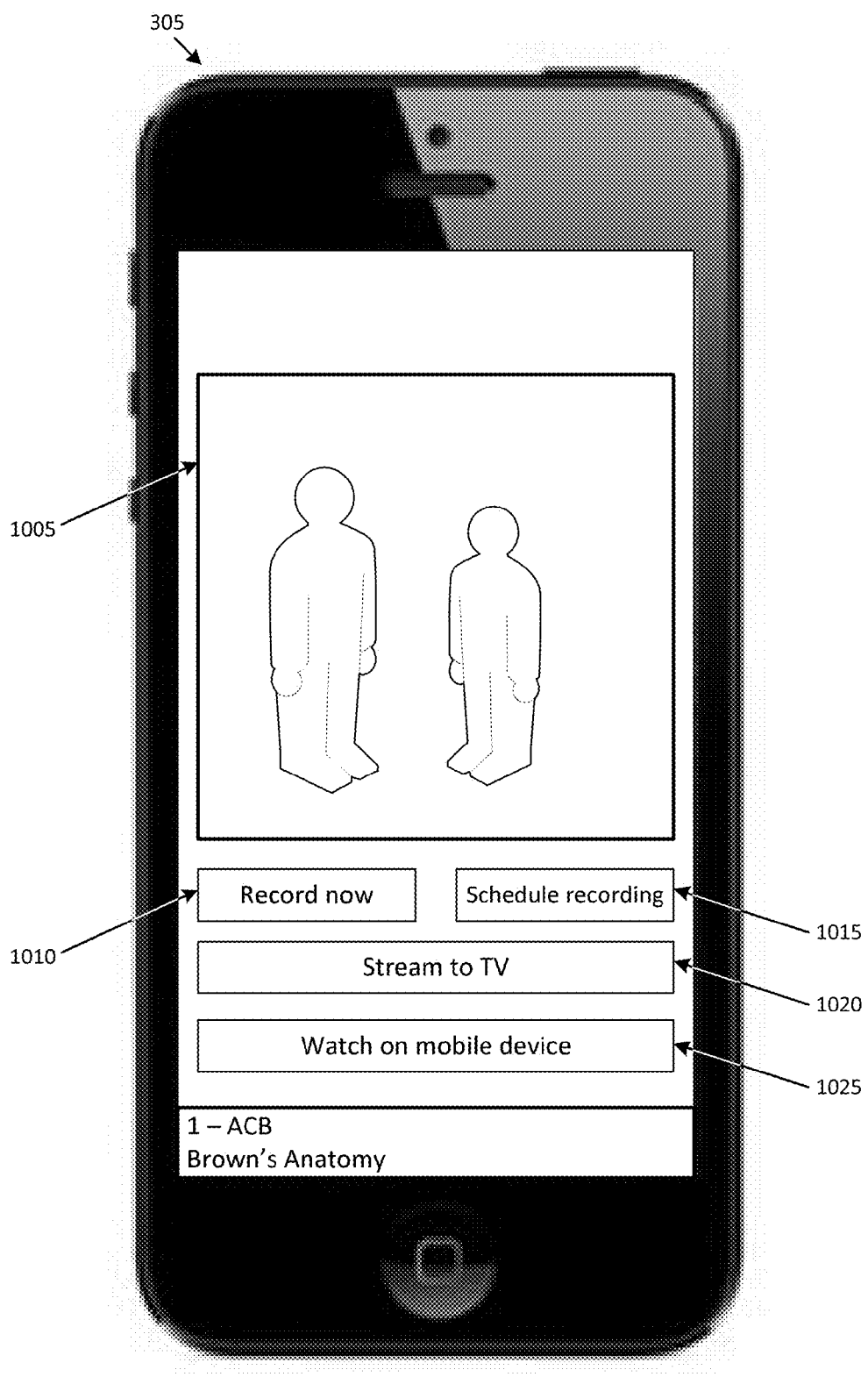
FIG. 10 illustrates an example user interface, corresponding to presentation options for a selected programming channel, that may be displayed by a user device.

FIG. 10 illustrates another user interface, via which a user may select presentation options for selected content. For instance, referring to FIG. 9, assume that the user selects channel 1. Based on this selection, user device 305 may display the user interface shown in FIG. 10. As also described above with respect to block 730 of FIG. 7, user device 305 may open a socket to a broadcast bearer associated with channel 1, thereby enabling user device 305 to present or otherwise process the television program associated with channel 1.

The user interface shown in FIG. 10 may include preview window 1005, as well as selectable options 1010-1025. Preview window 1005 may display the content associated with the selected channel. In some implementations, user device 305 may perform decoding, transcoding, downscaling, and/or other processing of the content, in order to display the content. For instance, assume that the content is 4K UHD content encoded using VEHC. User device 305 may perform VEHC decoding, and may downscale the content to match a resolution of preview window 405.

Option 1010 may cause user device 305 to record the television program presently being presented via the channel (e.g., on a local memory device associated with user device 305, on storage device 315, or another storage device). User device 305 may also include an option (not shown) to retrieve previous recordings (e.g., as stored on user device 305, storage device 315, or another device) for later viewing or outputting. Option 1015 may cause user device 305 to schedule a later recording. For example, a user may desire to record a program that will be shown later on the same channel, without necessarily desiring to record the presently showing program.

Option 1020 may cause user device 305 to output the presently showing program to content presentation device 310. For instance, as described above, user device 305 may be communicatively coupled to content presentation device 310 wirelessly and/or via a wired connection. As also described above, user device 305 and content presentation device 310 may implement a DLNA standard, a UPnP standard, a DTCP-IP standard, and/or another standard that facilitates communication between user device 305 and content presentation device 310.

Option 1025 may cause user device 305 to present the selected content via, for example, a screen and/or a set of speakers associated with (e.g., integrated in) user device 305. User device 305 may further transcode and/or downsize the content, in order to display the content in a full screen (or near-full screen) mode.

Figure 11:
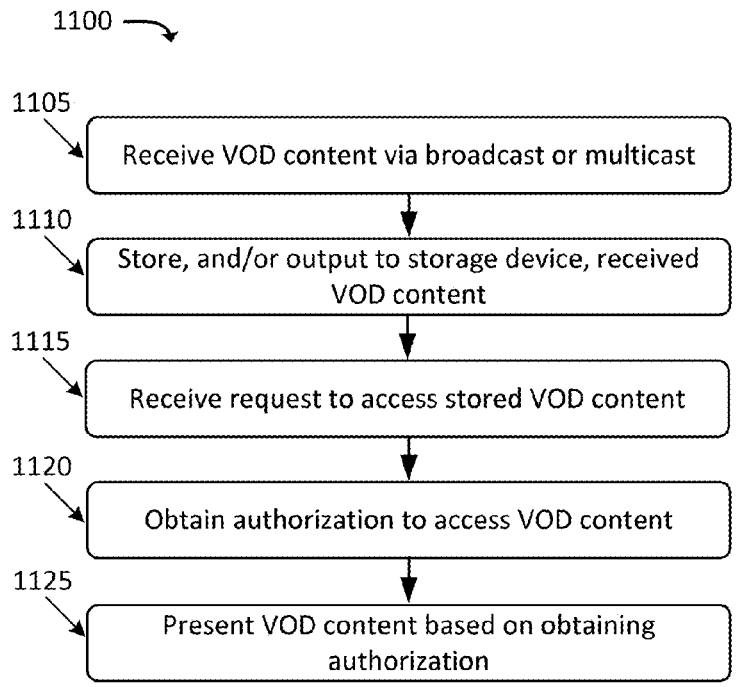
FIG. 11 illustrates an example process for presenting video on demand ("VOD") content that has been broadcasted to user devices.

FIG. 11 illustrates an example process 1100 for presenting VOD content that has been broadcasted to user devices. VOD content may correspond to content which may be accessed at a time that is independent of a time at which it was broadcasted. Some VOD content may be on a pay-per-view basis. That is, a user who wishes to access a pay-per-view VOD program must provide payment in order to access the pay-per-view VOD program. Other VOD content may be provided free of charge, or on a subscription basis. In one example implementation, process 1100 may be performed by user device 305. In other implementations, some or all of process 1100 may be performed by one or more other devices in lieu of, or in conjunction with, user device 305.

Process 1100 may include receiving VOD content via broadcast or multicast (block 1105). For example, user device 305 may receive VOD content via MBMS, eMBMS, CBS, and/or another broadcast or multicast delivery method. User device 305 may receive the VOD content in addition to, or in lieu of, channel guide content and/or "live" channels (e.g., channels that correspond to content that is accessed in "real time," with respect to when they are transmitted). In some implementations, user device 305 may be configured to open a socket to one or more bearers that correspond to VOD content, in order to enable subsequent processing (e.g., as described below with respect to blocks 1110-1125).

Process 1100 may also include storing, and/or outputting to a storage device, the received VOD content (block 1110). For example, user device 305 may locally store the VOD content, and/or may output the VOD content to storage device 315 or another device for storage.

Process 1100 may further include receiving a request to access stored VOD content (block 1115). For instance, user device 305 may receive a request from a user to access VOD content that was received at block 1105. The request may be made by way of a user interface (not shown), which presents options for different VOD content that is available (e.g., has been stored by user device 305, storage device 315, or another device).

Process 1100 may additionally include obtaining authorization to access the requested VOD content (block 1120). For instance, as mentioned above, the VOD content may correspond to pay-per-view content, subscribed content, etc. In such a scenario, user device 305 may communicate with content provider 360, HSS/AAA server 340, and/or another device in order to determine whether user device 305 is authorized to access the VOD content, or what steps are necessary before user device 305 is authorized to access the content (e.g., obtain a user name and password, obtain payment information, etc.).

In some implementation, user device 305 may determine whether user device 305 is authorized to access VOD content before storing the content. In situations where user device 305 is not authorized to access VOD content, user device 305 may forgo storing (at block 1110) the content, or may obtain authorization prior to storing the content.

Process 1100 may also include presenting the selected VOD content based on obtaining the authorization (block 1125). For instance, user device 305 may cause the selected VOD content to be played on content presentation device 310, user device 305, and/or another device.

Figure 12:
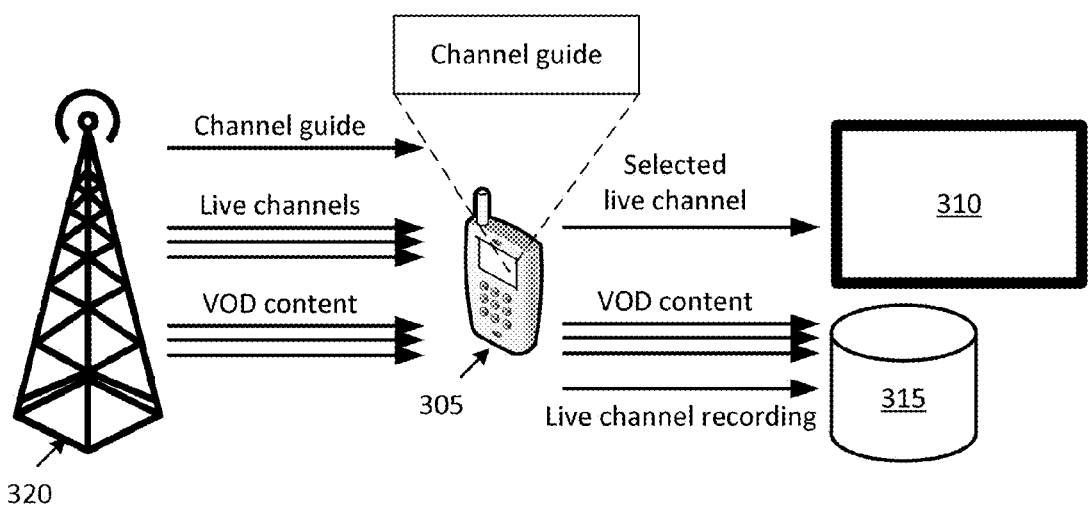
FIG. 12 conceptually illustrates another example of how a user device may act as a media gateway.

FIG. 12 illustrates concepts relating to VOD content delivery, described above with respect to FIG. 11. As shown, base station 320 may broadcast or multicast content over multiple bearers, with one bearer corresponding to a channel guide, one set of bearers corresponding to live channels, and another set of bearers corresponding to VOD content. User device 305 may display the channel guide, and may output a selected live channel to content presentation device 310. In some implementations, user device 305 may output more than one content stream to content presentation device 310 (e.g., in a picture-in-picture scenario). As further shown, user device 305 may output the VOD content, received from base station 320, to storage device 315 for later retrieval. As also shown, user device 305 may additionally output content, corresponding to another live channel ("Live channel recording"), to storage device 315 for later retrieval.

As may be apparent from the above description, implementations described herein facilitate the use of user devices, such as wireless telephones, as truly portable, robust, upgradable, easy-to-deploy media gateways. Content providers are able to reach a wider audience, network service providers are able to deploy up-to-date hardware and software without involving costly STBs, and end users are able to enjoy flexibility and portability. Implementations described above may facilitate the proliferation of high-fidelity content, such as HD content, UHD content, FHD3D content, 1080 p 60 Hz content, etc.

In some implementations, a user device may be used to output content, which may be broadcasted, multicasted, or unicasted to other user devices. In this sense, a user device may be considered to act as a content provider. In some such situations, the user device may receive content from a mobile-to-mobile ("M2M") device (e.g., a medical device such as a heart rate monitor or a temperature monitor, a home security monitoring device such as a camera or a door sensor, or another type of M2M device). The receiving user device may then output the content to a television, a NAS, or another device (e.g., over a PAN). Such an implementation may be useful in the medical field, where a patient may provide video to a doctor, who may use the video to diagnose or treat the patient.

Figure 13:
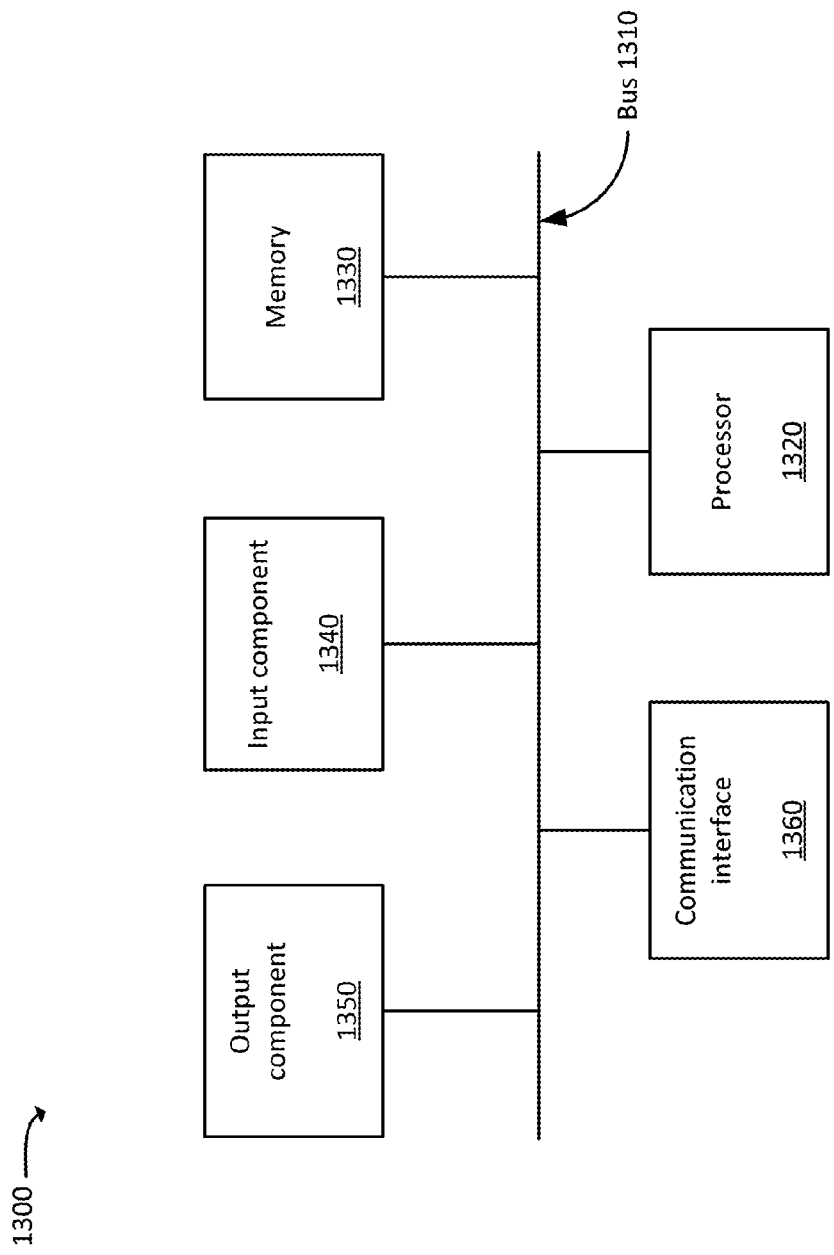
FIG. 13 illustrates example components of one or more devices, according to one or more implementations described herein.

FIG. 13 is a diagram of example components of device 1300. One or more of the devices described above (e.g., as described with respect to FIGS. 1-4, 6, 8-10, and 12) may include one or more devices 1300. Device 1300 may include bus 1310, processor 1320, memory 1330, input component 1340, output component 1350, and communication interface 1360. In another implementation, device 1300 may include additional, fewer, different, or differently arranged components.

Bus 1310 may include one or more communication paths that permit communication among the components of device 1300. Processor 1320 may include a processor, microprocessor, or processing logic that may interpret and execute instructions. Memory 1330 may include any type of dynamic storage device that may store information and instructions for execution by processor 1320, and/or any type of non-volatile storage device that may store information for use by processor 1320.

Input component 1340 may include a mechanism that permits an operator to input information to device 1300, such as a keyboard, a keypad, a button, a switch, etc. Output component 1350 may include a mechanism that outputs information to the operator, such as a display, a speaker, one or more light emitting diodes ("LEDs"), etc.

Communication interface 1360 may include any transceiver-like mechanism that enables device 1300 to communicate with other devices and/or systems. For example, communication interface 1360 may include an Ethernet interface, an optical interface, a coaxial interface, or the like. Communication interface 1360 may include a wireless communication device, such as an infrared ("IR") receiver, a Bluetooth radio, a Wi-Fi radio, or the like. The wireless communication device may be coupled to an external device, such as a remote control, a wireless keyboard, a mobile telephone, etc. In some embodiments, device 1300 may include more than one communication interface 1360. For instance, device 1300 may include an optical interface and an Ethernet interface.

Device 1300 may perform certain operations relating to one or more processes described above. Device 1300 may perform these operations in response to processor 1320 executing software instructions stored in a computer-readable medium, such as memory 1330. A computer-readable medium may be defined as a non-transitory memory device. A memory device may include space within a single physical memory device or spread across multiple physical memory devices. The software instructions may be read into memory 1330 from another computer-readable medium or from another device. The software instructions stored in memory 1330 may cause processor 1320 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations. For example, while series of blocks have been described with regard to FIGS. 7 and 11, the order of the blocks may be modified in other implementations. Further, non-dependent blocks may be performed in parallel.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown (e.g., in FIGS. 3 and 4), in practice, additional, fewer, or different, connections or devices may be used. For example, while a connection is not shown, in FIG. 3, between content provider 360 and message broadcast server 355, in some implementations, content provider 360 may communicate either directly or indirectly with message broadcast server 355. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A system, comprising:
  one or more base stations of a wireless network, configured to:
    receive programming content from a content provider, the programming content being associated with a plurality of programming channels;
    receive information identifying a set of user devices that are associated with a subscription to a particular set of programming channels, of the plurality of programming channels associated with the programming content received from the content provider;
    output the information, identifying the set of user devices that are associated with the subscription to the particular set of programming channels, to a particular user device, of a plurality of user devices; and
    distribute the received programming content, via a broadcast or multicast technique, to the plurality of user devices, wherein the particular user device uses the information, identifying the set of user devices that are associated with the subscription to the particular set of programming channels, to output the received programming content to a device that is external to the particular user device, the distributing including:
      multicasting the programming content, associated with the particular set of programming channels, to the identified set of user devices that are associated with the subscription to the particular set of programming channels, without distributing the programming, associated with the particular set of programming channels, to user devices that have not been identified as being associated with the subscription to the particular set of programming channels.

2. The system of claim 1, wherein outputting the programming content to the device that is external to the user device includes outputting the programming content according to at least one of:
  a Digital Living Network Alliance ("DLNA") standard,
  a Universal Plug and Play ("UPnP") standard,
  a Digital Transmission Content Protection over Internet Protocol ("DTCP-IP") standard, or
  a High-bandwidth Digital Content Protection ("HDCP") standard.

3. The system of claim 1, wherein the broadcast or multicast technique includes one of:
  a Multimedia Broadcast Multicast Service ("MBMS") technique,
  an evolved MBMS ("eMBMS") technique, or
  a Cell Broadcast Service ("CBS") technique.

4. The system of claim 1, wherein the programming content includes video content that has a resolution greater than 1080p.

5. The system of claim 4, wherein the programming content includes Ultra High Definition ("UHD") video content.

6. A method, comprising:
  storing, by a user device, correlation information that correlates a set of broadcast or multicast bearers to a set of programming channels,
    wherein the correlation information indicates at least one of:
      a mapping between a first set of broadcast or multicast bearers to a first set of programming channels, to which the user device is subscribed, or
      a mapping between a second set of broadcast or multicast bearers to a second set of programming channels, to which the user device is not subscribed;
  receiving, by the user device, content that has been distributed via one or more broadcast or multicast bearers;
  identifying, by the user device and using the correlation information, one or more programming channels, of the set of programming channels, that are associated with at least one of the one or more broadcast or multicast bearers;
  presenting, by the user device, information regarding the identified one or more programming channels,
    wherein presenting the information regarding the identified one or more programming channels includes at least one of:
      presenting information identifying the first set of programming channels, to which the user device is subscribed, or
      presenting information that does not identify the second set of programming channels, to which the user device is not subscribed;
  receiving, by the user device, a selection of a particular programming channel, of the identified one or more programming channels; and
  presenting, by the user device, content that has been received via a particular bearer, of the one or more bearers, the particular bearer being associated with the particular programming channel.

7. The method of claim 6,
wherein at least one bearer, of the one or more bearers, is associated with a channel guide,
wherein presenting information regarding the one or more programming channels includes presenting channel guide content received via the at least one bearer.

8. The method of claim 6, further comprising:
opening, based on receiving the selection of the particular programming channel, a socket to the particular bearer that is associated with the particular programming channel,
wherein opening the socket facilitates the presenting of the content.

9. The method of claim 6, wherein presenting the content includes outputting the content to a network attached storage ("NAS") device.

10. The method of claim 6, further comprising:
receiving the correlation information from a server device that manages subscriptions associated with the user device.

11. The method of claim 6, wherein presenting the content includes outputting the content to an external device via a personal area network ("PAN").

12. A user device, comprising:
one or more memory devices configured to store:
correlation information that correlates a set of broadcast or multicast bearers to a set of programming channels, wherein the correlation information indicates at least one of:
a first subset, of the set of programming channels, of programming channels to which the user device is subscribed, or
a second subset, of the set of programming channels, of programming channels to which the user device is not subscribed, and
a set of processor-executable instructions; and
one or more processors configured to execute the set of processor-executable instructions, wherein executing the set of processor-executable instructions causes the one or more processors to:
identify, using the correlation information, one or more programming channels, of the set of programming channels, that are associated with one or more bearers via which content, distributed via multicast or broadcast, has been received by the user device;
present selectable options regarding the first subset of programming channels, to which the user device is subscribed, without presenting information identifying the second subset of programming channels, to which the user device is not subscribed;
receive a selection of a particular selectable option associated with a particular programming channel, of the first subset of programming channels;
present a plurality of presentation options for presentation of content associated with the particular programming channel, the plurality of presentation options including at least:
a first presentation option to stream the content to a display device that is external to the user device, and
a second presentation option to present the content via a display screen of the user device;
receive a selection of a particular presentation option, of the plurality of presentation options; and
present, in accordance with the selected particular option, content that has been received via a particular bearer, of the one or more bearers, the particular bearer being associated with the particular programming channel.

13. The user device of claim 12,
wherein at least one bearer, of the one or more bearers, is associated with a channel guide,
wherein executing the set of processor-executable instructions further causes the one or more processors to present channel guide content received via the at least one bearer,
wherein presenting the channel guide content causes the one or more processors to:
present the set of selectable options.

14. The user device of claim 12, wherein executing the set of processor-executable instructions further causes the one or more processors to:
opening, based on receiving the selection of the particular programming channel, a socket to the particular bearer that is associated with the particular programming channel,
wherein opening the socket facilitates the presenting of the content.

15. The user device of claim 12, wherein executing the set of processor-executable instructions to present the content further causes the one or more processors to:
output the content to a network attached storage ("NAS") device,
output the content to an audio playback device, or
output the content to a media player device.

16. The user device of claim 12, wherein executing the set of processor-executable instructions further causes the one or more processors to:
receive the correlation information from a server device that manages subscriptions associated with the user device.

17. The user device of claim 12, wherein executing the set of processor-executable instructions to present the content further causes the one or more processors to output the content to an external device via a personal area network ("PAN").

18. The method of claim 6, wherein a particular broadcast or multicast bearer is identified, in the correlation information, using a Temporary Mobile Group Identity ("TMGI") associated with the particular broadcast or multicast bearer.

19. The method of claim 6, wherein presenting the content includes at least one of:
outputting the content to a television device,
outputting the content to an audio playback device, or
outputting the content to a media player device.

\* \* \* \* \*